Figure 1:
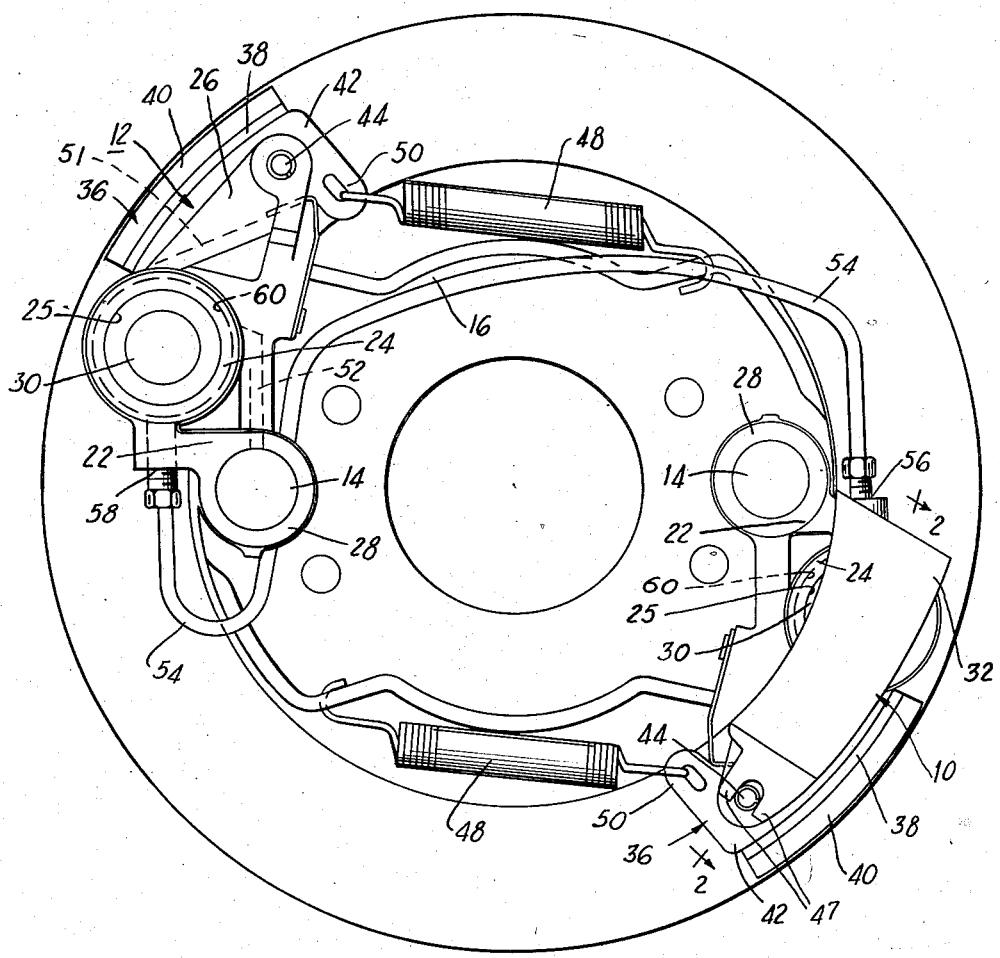

Feb. 3, 1959  R. T. BURNETT  2,871,991
BRAKE
Filed Sept. 15, 1954  2 Sheets-Sheet 1

INVENTOR.
RICHARD T. BURNETT
BY John A. Young
ATTORNEY ated Feb. 3, 1959

2,871,991
BRAKE

Richard T. Burnett, South Bend, Ind., assignor to Bendix Aviation Corporation, South Bend, Ind., a corporation of Delaware Application September 15, 1954, Serial No. 456,218

9 Claims. (Cl. 188—70)

This invention relates to brakes and more particularly to a composite disk-and-shoe brake unit.

In providing a composite brake unit which includes several friction-producing elements, there are several manufacturing and field service problems which are not encountered with conventional brakes. For one thing, the configuration of the unit is quite dissimilar from the conventional arcuate brake shoe; the rather intricate shape of the unit tends to rule out the possibility of manufacturing the device by a stamping process. Hence, I propose to construct the friction unit in this invention by building it up from separable portions, applying to each of the portions the most favorable manufacturing method.

Another complicating factor which is introduced with a brake unit having distinct friction-producing elements, is the possibility of differential rate in wear of the separate friction elements. It is desirable to provide for this possibility by enabling separate replaceability of any of the friction elements independently of the other elements and with a minimum effort. To be practicable, this replaceability of each friction element must be a simple operation, it must be without requirement of special tools, and it must be accomplished with a minimum disruption of the remainder of the friction unit.

An object of this invention is to provide a friction unit of the type illustrated in my co-pending application Serial No. 369,197 which includes the following features:

(a) Replaceability of the shoe portion of the friction unit thus making for increased economy since only that element of the unit need be substituted when it becomes outworn, and (b) Forming a portion of the unit as a casting to reduce manufacturing cost without any sacrifice in strength of the unit.

My over-all object is to maintain generally the outstanding performance characteristics of the brake unit in application Serial No. 369,197 but simplify and improve upon the fabrication and replacement problems connected with this type of brake.

The above and other objects and features of the invention appear more fully hereinafter from a consideration of the following description, taken in connection with the accompanying drawings wherein an embodiment of the invention is illustrated by way of example.

Figure 2:
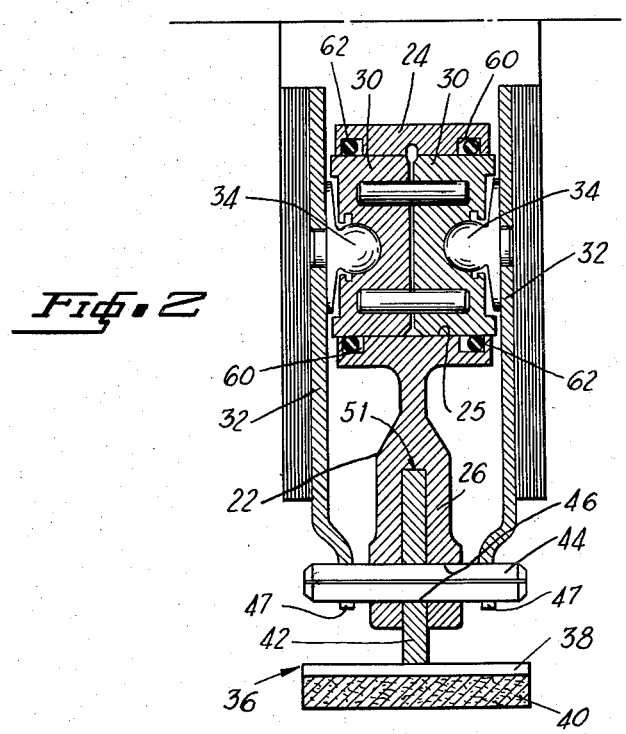

In the drawings:

Figure 1 is a side elevation of a brake assembly incorporating two of my novel friction units, the disk elements being removed from one of the units; and Figure 2 is a section view taken on the line 2—2 of Figure 1.

Referring to Figure 1, friction units 10 and 12 are pivotally mounted on anchors 14 which are secured to a torque-taking member 16. The torque-taking member 16 may be fastened to a nonrotatable member, such as an axle flange (not shown) in any suitable manner.

The brake assembly is used in conjunction with a U-shaped cross section rotor of the type illustrated in my copending application Serial No. 369,197, filed July 20, 1953.

Each of the friction units is identically constructed. The following detailed description of one of the units applies equally to both. The friction unit 10 includes a cast portion 22 having integrally formed therewith a cylinder 24 with a cylinder bore 25. The cast portion 22 has a bifurcated segment 26 and a pivotal mounting segment 28 through which anchor 14 extends to pivotally support the unit.

A pair of oppositely acting pistons 30 are slidably received in the cylinder 24; disk friction elements 32 are secured on opposite ends of the pistons by means of ball-socket connections 34 permitting swiveling movement of the disk elements 32 on the pistons. This feature and the construction of the pistons is the subject matter of application Serial No. 396,470, filed December 7, 1953, and is disclosed herein only for an understanding of the full scope of the present invention.

A shoe friction element 36, consisting of a rim 38 having friction material lining 40 and a strengthening web 42, is attached to the cast portion 22 of the friction unit through the bifurcated component 26. The web 42 is received within the bifurcated component 26 and retained therein by a removable pin 44 which is driven through congruent openings 46 in the cast portion 26 and web 42. The pin 44 is formed as a cylindrical sleeve which is split along one side in a direction parallel to the major axis. The pin 44 is slightly larger than the congruent openings 46 but is compressed to the position shown as it is driven into position; the expansile tendency of the pin retains it in place. A part 47 of the disk elements 32 extends into abutting contact with opposite ends of the pin 44. See Figure 2. In this manner, the pin 44, in addition to serving as a fastening means for the shoe 36 and cast portion 22, also pilots the disk elements 32 in their axial movement and locates their position in the brake assembly.

A return spring 48 is associated with each of the brake units to urge the shoe portion 36 away from an applied position. Each of the return springs 48 is fastened between the torque taking member 16 and an ear 50 which is formed on the web 42 of the shoe.

The return spring 48 assists in keeping the shoe portion 36 in proper position on the brake unit. The shoe portion 36 is pivoted on the unit by pin 44; the spring force exerted on the shoe portion tends to turn the shoe portion about pin 44 and in a direction urging the web 42 against the cast portion 22. The point of attachment of the spring with the shoe portion 36 is so located as to cause this tendency of the shoe portion to turn against the cast portion 22 so that the two portions are kept in abutting relation at surface 51.

The hydraulic system for actuating the disk elements 32, includes the anchors 14 which provide inlet and bleed passages (not shown). Conduits 52 may be formed integrally with the cast portion 22 to communicate the passages in the anchors with the cylinders 24. An external conduit 54 interconnects ports 56 and 58 in units 10 and 12.

The disk elements are applied against the sides of a rotor (not shown) by operator controlled fluid pressure. The engagement of the disk element with the rotor causes the entire unit to pivot about its respective anchor, bringing shoe portion 36 into frictional engagement with the cylindrical surface of the rotor.

An annular groove 60 of approximately rectangular cross section is formed in the cylinder bore 25 adjacent either of the opposite open ends of the cylinder 24. An O-ring seal 62 is positioned in the bore within the groove 60.

The O-ring seal 62 exerts retracting force on the pistons. This operation is more fully explained in my copending application Serial No. 455,451, filed September 9, 1954, now Patent No. 2,725,573, wherein this structure is claimed.

Although this invention has been described in connection with a specific embodiment, the principles involved are susceptible of numerous other applications and they will occur readily to persons skilled in the art.

I claim:

1. A friction unit comprising a cast portion having a cylinder bore formed in said cast portion, a pair of oppositely-acting pistons reciprocably received in said cylinder bore, a friction-producing element detachably secured to each of said pistons, an annular groove formed in said cylinder bore adjacent each of the opposite ends thereof, a resilient seal received in each of said grooves and contacting said pistons, a second friction-producing element removably associated with said friction unit, said second friction-producing element consisting of a lined rim substantially normal to the planes of said first friction-producing elements and a transverse strengthening web, said cast portion having a bifurcated component arranged to receive the web of said friction-producing element therebetween, a pin for securing said second friction-producing element and cast portion together, said pin extending on both sides of the unit to pilot said first friction-producing elements, and means for pivotally associating said unit with an anchor member.

2. In a brake, a friction unit comprising a cast portion having a cylinder bore formed therein, a pair of pistons slidably received in said cylinder bore, a friction-producing element detachably associated with each of said pistons, resilient sealing means received in the wall of said cylinder bore, said cast portion having a bifurcated component, a second friction-producing element with a part thereof received within said bifurcated component, removable means for securing said cast portion and second friction-producing element together, said second friction-producing element having a surface engageable with a rotatable member and located in a plane substantially normal to the planes of said first friction-producing elements, and a component of said cast portion adapted to associate the unit with an anchor member.

3. A friction unit comprising first and second detachable portions, a fluid motor constructed as a part of said first portion with the longitudinal axis of said fluid motor extending transversely to said first portion, a component of said first portion being formed to pivotally associate said brake unit with an anchor member, a pair of oppositely acting friction-producing elements operatively connected to said motor for actuation in opposite directions along a common axis which is substantially coincident with the axis of said fluid motor, said second separable portion having a friction-producing element with a braking surface which lies in a plane normal to the planes of said pair of friction-producing elements engageable with a cylindrical drum surface, and a removable pin for securing the portions of said unit together.

4. A friction unit comprising two separable portions, one of said portions including a fluid motor and means for pivotally associating said unit with an anchor member, the other of said portions having a brake shoe element, a removable pin for securing the separable portions of said unit together, and a pair of oppositely acting spreadable friction elements which move apart relatively to each other along a common axis detachably associated with said fluid motor for actuation thereby in opposite directions along a common axis, said removable pin extending at opposite ends thereof into contact with said second mentioned friction elements to pilot said elements.

5. A friction unit comprising a first portion, a fluid motor associated with said first portion, said first portion having a component pivoting the unit on an anchor member, a pair of oppositely acting spreadable disk elements which move apart relatively to each other along a common axis and are removably secured to said fluid motor for actuation thereby in opposite directions along a common axis, a second portion of said brake unit detachably connected to said first portion, and removable fastening means for securing said portions together, said second portion of said brake unit constituting a radially-actuated friction-producing element engageable with a cylindrical rotor surface.

6. A composite disk-and-shoe brake unit comprising a first portion having operatively associated therewith a pair of disk elements which are applied equally in opposite directions along a common axis, means for mounting the disk elements in the first portion for movement relative to each other along a line normal to the face of the disk elements and substantially parallel to the face of the shoe brake, said first portion having means for pivotally associating said unit with an anchor member, and a second portion of said unit detachably connected to said first portion and consisting of a shoe brake element, and removable fastening means for securing said portions together, the disk elements of said brake unit being constructed and arranged to accomplish substantially equal amounts of braking work during actuation thereof, the shoe and disk elements being so related that the detachable connection therebetween lies approximately midway between the disk elements.

7. A friction unit comprising a first and second portion deatchably secured together, oppositely acting relatively movable friction elements which are spread apart along an axis normal to the planes of the friction surfaces thereof, said friction elements being movable in opposite directions along a common axis and operatively associated with said first portion, said elements being applied with substantially equal effort to accomplish a substantially equal amount of braking work during actuation thereof, a component of said first portion which pivots said unit on a fixed member, said second portion constituting a radially movable friction-producing element, and removable fastening means for securing said detachable portions together.

8. A friction unit comprising a cast first portion having received therein a pair of disk friction elements movable in opposite directions along a common axis, said cast portion also having a bifurcated segment and a segment adapted for pivotally mounting said unit, a shoe portion received in the bifurcated segment to be interlocked therewith, a removable pin pivotally securing said shoe portion to the bifurcated segment to said cast first portion, said shoe portion being thereby detachably secured to said cast first portion, an actuator which is mounted in said cast first portion, a friction member at each side of said cast portion and operatively connected with said actuator to be spread apart relatively to each other and resilient means fastened between said shoe portion and a fixed member to produce turning of the shoe portion about said pin in a direction maintaining the shoe and cast portions in abutting relation.

9. A friction unit comprising a cast first portion having received therein a pair of disk friction elements movable in opposite directions along a common axis, a shoe portion, said cast first portion having a segment thereof adapted for pivotally mounting said unit, removable fastening means pivotally securing said cast first portion to said shoe portion, an actuator which is mounted in said cast first portion, two friction members operatively connected to said actuator and actuated by said actuator in opposite directions by energization of said actuator and resilient means for exerting a turning force on said shoe portion about said fastening means in the direction of the cast first portion to maintain said cast portion and shoe portion in abutting relation.

References Cited in the file of this patent

UNITED STATES PATENTS

| 1,789,957 | Connell | Jan. 27, 1931 |
| 1,956,315 | Collins | Apr. 24, 1934 |
| 2,050,902 | Tatter | Aug. 11, 1936 |
| 2,602,525 | Jurgens | July 8, 1952 |
| 2,629,473 | Vincent | Feb. 24, 1953 |

FOREIGN PATENTS

| 521,091 | Germany | Mar. 18, 1931 |
| 707,074 | Germany | June 12, 1941 |